United States Patent [19]

Beaver et al.

[11] Patent Number: 4,690,748
[45] Date of Patent: Sep. 1, 1987

[54] PLASTIC ELECTROCHEMICAL CELL TERMINAL UNIT

[75] Inventors: Richard N. Beaver, Angleton; Gregory J. Morris, Lake Jackson; John R. Pimlott, Sweeny; Hiep D. Dang, Lake Jackson, all of Tex.

[73] Assignee: The Dow Chemical Company, Midland, Mich.

[21] Appl. No.: 809,374

[22] Filed: Dec. 16, 1985

[51] Int. Cl.[4] .................. C25B 9/04; C25B 11/03; H01R 11/00; H01M 4/02
[52] U.S. Cl. .................. 204/279; 204/280; 204/284; 204/286; 429/211; 429/234
[58] Field of Search ............ 339/218 M, 59 R, 59 M; 204/279, 280, 284, 253–258, 288, 286; 429/209–211, 234

[56] References Cited

U.S. PATENT DOCUMENTS

| | | | |
|---|---|---|---|
| 3,849,279 | 11/1974 | Barkel | 204/255 X |
| 3,950,239 | 4/1976 | Figueras | 204/284 X |
| 4,050,756 | 9/1977 | Moore | 339/59 M |
| 4,115,236 | 9/1978 | Smura | 204/254 |
| 4,581,114 | 4/1986 | Morris et al. | 204/253 X |

Primary Examiner—Donald R. Valentine

[57] ABSTRACT

The invention is an electrochemical article suitable for use in monopolar or bipolar electrochemical cells comprising:
an organic, planar plastic member having a plurality of horizontally and vertically spaced-apart shoulders protruding outwardly from opposing generally coplanar surfaces of said planar plastic member;
at least one electrically conductive insert extending from an exterior face of a shoulder on a first surface of the planar plastic member, through the planar plastic member, to an exterior face of a shoulder on a second surface of the planar plastic member, wherein each of said shoulders annularly encircles and supports each of said inserts;
an electrically conductive, substantially completely hydraulically impermeable protective liner resistant to the corrosive effects of electrolyte matingly contacted with the first surface of said planar plastic member and adapted to minimize contact between the electrolyte and said planar plastic member within the cell; and
an electrical connection means electrically connected to at least a portion of the inserts at the second surface of the planar plastic member, said connection means adapted to connect a pole of an electric current power supply to at least a portion of the inserts.

24 Claims, 2 Drawing Figures

PLASTIC ELECTROCHEMICAL CELL TERMINAL UNIT

The present invention relates to an improved electrochemical terminal unit and particularly to a chlor-alkali terminal unit.

BACKGROUND OF THE INVENTION

Chlorine and caustic are essential and large volume commodities which are basic chemicals required in all industrial societies. They are produced almost entirely electrolytically from aqueous solutions of an alkali metal chloride with a major portion of such production coming from diaphragm type electrolytic cells. In the diaphragm electrolytic cell process, brine (sodium chloride solution) is fed continuously to the anode compartment and flows through a diaphragm usually made of asbestos, backed by a cathode. To minimize back migration of the hydroxide ions, the flow rate is always maintained in excess of the conversion rate so that the resulting catholyte solution has unused alkali metal chloride present. Hydrogen ions are discharged from the solution at the cathode in the form of hydrogen gas. The catholyte solution, containing caustic soda (sodium hydroxide), unreacted sodium chloride and other impurities, must then be concentrated and purified to obtain a marketable sodium hydroxide commodity and sodium chloride which can be reused in the chlorine and caustic electrolytic cell for further production of sodium hydroxide.

With the advent of technological advances such as the dimensionally stable anode and various coating compositions therefor which permit ever narrowing gaps between the electrodes, the electrolytic cell has become more efficient in that the current efficiency is greatly enhanced by the use of these electrodes. Also, the hydraulically impermeable membrane has added a great deal to the use of electrolytic cells in terms of the selective migration of various ions across the membrane so as to exclude contaminants from the resultant products thereby eliminating some costly purification and concentration steps of processing.

The dimensionally stable anode is today being used by a large number of chlorine and caustic producers but the extensive commercial use of hydraulically impermeable membranes has yet to be realized. This is at least in part due to the fact that a good, economical electrolytic cell structure for use of the planar membrane versus the three dimensional diaphragm has yet to be provided. The geometry of the diaphragm electrolytic cell's structure makes it undesirable to place a planar membrane between the electrodes, hence the filter press electrolytic cell structure has been proposed as an alternative electrolytic cell structure for the use of membrane in the production of chlorine, alkali metal hydroxides and hydrogen.

There are two basic types of electrochemical cells commonly used for the electrolysis of brine solutions to form chlorine and caustic, i.e., monopolar cells and bipolar cells.

A bipolar filter press electrolytic cell is a cell consisting of several electrochemical units in series, as in a filter press, in which each unit, except the two end units, acts as an anode on one side and a cathode on the other, with the space between these bipolar units being divided into an anode and a cathode compartment by a membrane. In a typical operation, an alkali metal halide solution is fed into the anode compartment where halogen gas is generated at the anode. Alakli metal ions are selectively transported through the membrane into the cathode compartment and associate with hydroxide ions at the cathode to form alkali metal hydroxides, as hydrogen is liberated. In this type of cell the resultant alkali metal hydroxide is significantly purer and can be more concentrated, thus minimizing an expensive evaporation and salt separation step of processing. Cells where the bipolar electrodes and membranes are sandwiched into a filter press type construction are electrically connected in series, with the anode of one, connected to the cathode of an adjoining cell through a common structural member of some sort.

Monopolar, filter press, electrolytic units are known comprising terminal cells and a plurality of cathode units and anode units positioned alternately between the terminal cells.

A separator, which may be a diaphragm, or an ion exchange membrane, is positioned between each adjacent anode and cathode to divide the cell into a plurality of anode and cathode units. Each of the anode units is equipped with an inlet through which electrolyte may be fed to the unit and an outlet or outlets through which liquids and gases may be removed from the unit. Each cathode unit is similarly equipped with an outlet or outlets and if necessary with an inlet through which liquid, e.g. water, may be fed to the cathode units. Each of the anodes in the cell is also equipped with connections through which electrical current may be fed to the cell and each of the cathodes is equipped with connections through which electrical current may flow away from the cell.

In monopolar cells, electrical current is fed to one electrode unit and removed from an adjacent, oppositely charged unit. The current does not flow through a series of electrodes from one end of a series of cells to the other end of the series, as in a bipolar cell assembly.

To assure the effective use of substantially all of the surface of the electrodes in a monopolar cell, it is desirable to provide electrical current to the electrode relatively evenly and without excessive resistance losses. To accomplish this, workers in the prior art have devised a variety of mechanisms and designs by which electrical current may be efficiently delivered to the electrode.

The first, and most obvious means to provide electrical current to a monopolar cell is by directly connecting the power supply to the electrode using a wire, cable, rod, etc. Although this design minimizes the resistance losses in the electrical distribution system, it does not work well because some electrodes are not sufficiently electrically conductive to distribute the electrical current relatively uniformly throughout the entire electrode body. This is particularly true for titanium electrodes, which are frequently used in chlor-alkali cells. Thus, it is frequently necessary to provide a plurality of connections to the electrode to assure proper current distribution.

U.S. Pat. No. 4,464,242, for example, provides a thin, rectangular sheet electrode structure having electrical connections all across one, long edge. The electrode structure is sufficiently electrically conductive to distribute the electrical current through a narrow width of the electrode but not sufficiently conductive to distribute electrical current through the length of the electrode. Obviously, this electrical distribution means, works only for narrow electrodes and is not suitable for larger electrodes. In addition, the system is cumbersome and expensive because so many electrical connections are involved.

In a similar manner, U.S. Pat. No. 4,464,243 shows a cell where a plurality of electrode strips are electrically connected at their ends to an electrically conductive hollow frame. Since some electrodes are not very electrically conductive, the height of the electrodes is limited and such a system is limited to shorter electrodes. Also, this means of electrical attachment involves a plurality of electrical connections, each of which is an actual or potential electrical discontinuity. U.S. Pat. No. 4,464,243 also shows electrode sheets having ridges wherein the sheet acts as the conductor.

An alternate means for distributing electrical current to monopolar electrodes is illustrated in U.S. Pat. No. 4,056,458 where a plurality of titanium coated copper rods extend vertically between a pair of parallel, planar electrodes. The rods are electrically connected to both of the electrodes and provide electrical energy thereto. Because the rods are positioned at frequent intervals, the electrical current does not have very far to travel through the electrodes and the overall dimensions of the electrodes may be increased, so long as the number of rods is correspondingly increased. This means of electrical connection is, however, not entirely satisfactory because of its expense and complexity. In addition, there are a large number of actual or potential electrical discontinuity sites.

An electrical distribution means for monopolar electrochemical cells having a minimum number of parts, a minimum number of electrical connections, employing inexpensive, readily-available materials and allowing the use of electrodes of virtually any reasonable length and width would be highly desirable. It is the object of this invention to provide such a means.

SUMMARY OF THE INVENTION

The invention is an electrochemical terminal unit suitable for use in monopolar or bipolar electrochemical cells comprising:
- an organic, planar plastic member having a plurality of horizontally and vertically spaced-apart shoulders protruding outwardly from opposing generally coplanar surfaces of said planar plastic member;
- at least one electrically conductive insert extending from an exterior face of a shoulder on a first surface of the planar plastic member, through the planar plastic member, to an exterior face of a shoulder on a second surface of the planar plastic member, wherein each of said shoulders annularly encircles and supports each of said inserts;
- an electically conductive, substantially completely hydraulically impermeable protective liner resistant to the corrosive effects of electrolyte matingly contacted with the first surface of said planar plastic member and adapted to minimize contact between the electrolyte and said planar plastic member within the cell; and
- an electrical connection means electrically connected to at least a portion of the inserts at the second surface of the planar plastic member, said connection means adapted to connect a pole of an electric current power supply to at least a portion of the inserts.

BRIEF DESCRIPTION OF THE DRAWINGS

The invention can be better understood by reference to the drawings illustrating the invention, and wherein like reference numerals refer to like parts in the different drawing figures, and wherein.

DETAILED DESCRIPTION OF THE PREFERRED EMBODIMENT OF THE INVENTION

The present invention is a monopolar or bipolar electrochemical terminal unit assembly having a planar plastic member with inserts which efficiently and evenly provide electrical current to the electrode components of the cell. The invention is particularly suitable for use as a terminal unit in a chlor-alkali electrochemical cell series. As such, it is a simple, inexpensive, easily manufactured terminal unit highly suitable for commercial use.

"Electrochemical cell", as used herein, means a combination of elements, at least including two electrodes and a planar plastic member with inserts. The cell may be a monopolar cell having similarly charged electrodes or a bipolar cell having oppositely charged electrodes.

"Electrode component" means an electrode or an element associated with an electrode such as a current distributor grid or current collector. The component may be in the form of wire mesh, woven wire, punched plate, metal sponge, expanded metal, perforated or unperforated metal sheet, flat or corrugated lattice work, spaced metal strips or rods, or other forms known to those skilled in the art.

The planar plastic member of the present invention serves as both: (1) a means to conduct electrical current to the electrode components of the unit; and (2) a support means to hold the electrode components in a desired position.

Figure 1:
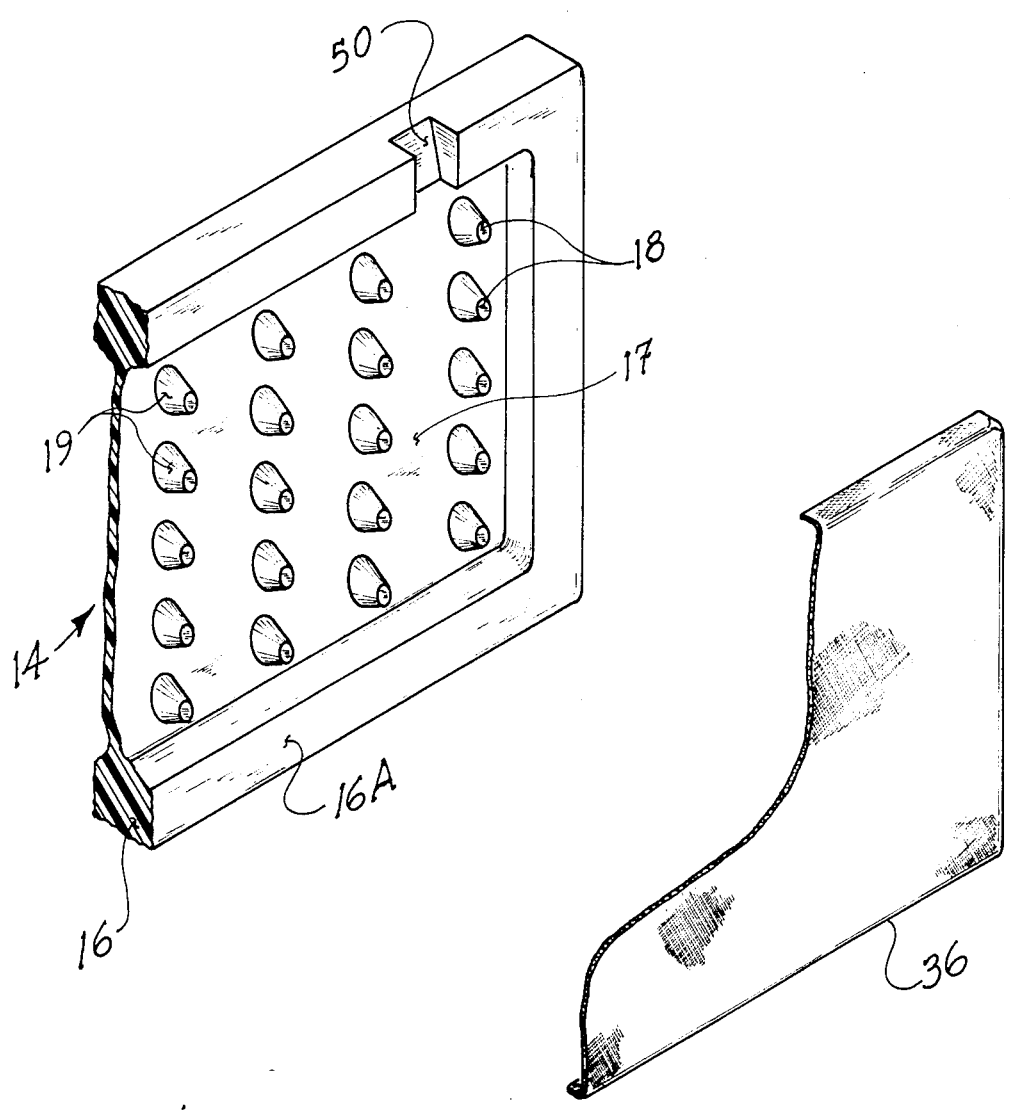
FIG. 1 is an exploded, partially broken-away perspective view of the terminal unit 10.
Figure 2:
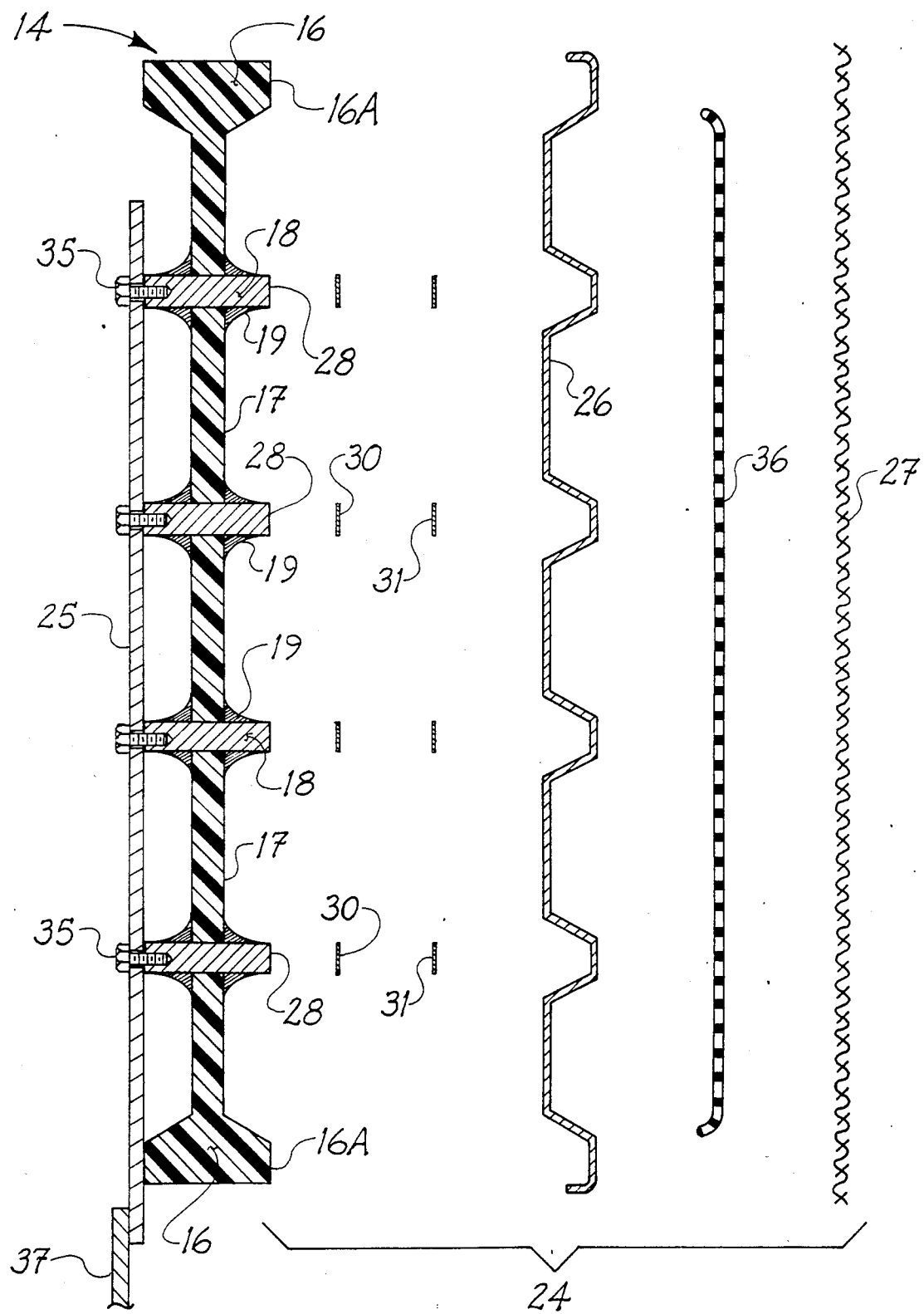
FIG. 2 is an exploded, sectional side view of the terminal unit of FIG. 1.

FIG. 1 shows a perspective view of one embodiment of the terminal unit 14 of the present invention. FIG. 2 is another view of the terminal unit 14 and shows a liner 26.

The terminal unit 14 comprises a plastic member 17 and inserts 18 and is surrounded on its peripheral edges with a frame structure 16 having a thickness greater than the thickness of the terminal unit 14 containing the inserts 18. Each of the inserts 18 are annularly encircled and supported by a shoulder at the terminal portion of each of said inserts 18. An opening 50 passes through the frame structure 16 to provide a passageway for the introduction of reactants into the cell or a passageway for the removal of products and depleted electrolyte from the cell. Electrode component 36 is positioned against inserts 18 in a position to be substantially coplanar to a surface of the frame structure 16.

The invention employs a planar plastic member 14 with inserts 18 which are made of a material which conducts electrical current through the planar plastic member 14 and to the electrode components of the terminal unit 14. The inserts 18 provide a pathway for the distribution of electrical energy substantially evenly to all parts of the electrode components. Because of the number of inserts 18 that may be provided in the planar plastic member 14, the dimensions of a terminal unit 14 of the present invention are not limited in size like those of the prior art.

A number of plastic materials are suitable for use in the present invention for the construction of planar plastic member 14. Without intending to be limited by the specific organic materials hereinafter delineated, examples of such suitable materials include polyethylene; polypropylene; polyvinylchloride; chlorinated polyvinyl chloride; acrylonitrile, polystyrene, polysulfone, styrene acrylonitrile, butadiene and styrene copolymers; epoxy; vinyl esters; polyesters; and fluoroplastics and copolymers thereof. It is preferred that a material such as polypropylene be used for the structural member since it produces a shape with adequate structural integrity at elevated temperatures, is readily available, and is relatively inexpensive with respect to other suitable materials.

It is surprising that the planar plastic member 14 can be produced by any of a number of processes known well to those skilled in the art of plastic molding. Such molding processes include, for example, injection molding, compression molding, transfer molding, and casting. Of these processes, injection molding has been found to satisfactorily produce a structure with adequate strength for use in an electrochemical cell. Preferably, the plastic is injected into a mold containing the desired number of inserts 18 (discussed later). In this manner, the planar plastic member 14 is a one-piece member which fits tightly around the inserts 18, holds them in place, and provides a high degree of support to them. Such a configuration minimizes the likelihood that the inserts 18 will separate from the planar plastic member 14 and become loose. The ease of molding relatively complex shapes and the strength of the finished injection molded article contribute to making this process preferred for making the herein described structural member. This a considerable advantage over the prior art where the plastic frame was molded first and then the electrical conductors were subsequently installed.

When the planar plastic member 14 is employed in an electrochemical cell for producing chlorine, the temperature of the cell and the planar plastic member 14 will frequently reach, or be maintained at, temperatures of from about 60° to about 90° Celsius. At these temperatures plastics, as do most materials, expand a measurable amount. Any expansion and later contraction on cooling of the plastic frame could result in electrolyte seeping from within the plurality of cells when joined together or, more importantly, could result in distortion of the anode and cathode which are made of metallic expanded mesh or perforated sheets. Furthermore, the differential expansion between the plastic frame 22 and the first protective liner 22 would create stress on the welds which affix these liners to the inserts 18 which are themselves molded in the plastic frame.

To reduce, and preferably minimize, the difference in expansion between the liner 22 and the planar plastic member 14, it is preferred to incorporate an additive to reduce thermally induced expansion of the planar plastic member 14. More preferably, the additive will also increase the structural strength of the finished plastic article. Such additive can be, for example, fiberglass, graphite fibers, carbon fibers, talc, glass beads, pulverized mica, asbestos, and the like, and combinations thereof. It is preferred that the plastic contain from about 5 to about 75 weight percent and more preferably from about 10 to about 40 weight percent of the additive. Glass fibers can be readily mixed with polypropylene to produce an injectable material suitable for use in the present invention which results in a solid, physically strong body with a coefficient of expansion less than polypropylene not containing glass fibers. Of greater importance is the need to minimize the difference in expansion between the planar plastic member 14, the electrodes, and the current collector, since these elements are welded together and it is critical that they remain substantially flat and parallel.

It has been determined that the use of commerically available polypropylene which has been specially formulated to afford bonding with the glass works particularly well. This results in a composite having a lower coefficient expansion than a mixture of polypropylene and glass fibers. Such chemicallycombined glass fiber reinforced polypropylene is available from, for example, Hercules, Inc., Wilmington, Del., as Pro-fax PC072 polypropylene.

Surrounding the planar plastic member 14 is a frame structure. The frame structure forms a peripheral area of each cell and encloses the electrode when a corresponding electrochemical unit (not shown) is positioned adjacent to the terminal unit 14. The frame structure preferably is in the form of a window frame and liners the peripheral edges of the plastic terminal In a preferred embodiment the flanges extend outwardly from the planar plastic member 14 about the same distance as the insert 26. Alternatively, but not preferred, separate spacer elements (not shown) could be utilized to build up the planar plastic member 14 sufficiently to permit a number of the plastic members to be combined into a cell series without having electrolyte, either anolyte or catholyte, leak from within the catholyte and anolyte compartments 30 and 32, respectively, to an exterior portion of the cell.

The frame structure may be a unitized body formed simultaneously with the planar plastic member 14. Optionally, a portion of it may be a unitized body formed simultaneously with the planar plastic member 14 and a portion of it may be attached later to complete the frame structure. Optionally, the frame structure may be assembled from a plurality of pieces and attached to the peripheral edges of the planar plastic member 14. The frame structure material may be metallic or plastic. For example, separate frames made of resiliently compressible material or substantially incompressible material may be conveniently placed over the peripheral portion of the terminal unit 14. Such frames may be fixed to the terminal unit 14 or may be simply clamped in position upon closing the filter press assembly. When using a substantially incompressible material, appropriate resilient gaskets may be used to insure hydraulic sealing according to normal practice. More preferably, the frame or flange portion is an integral part of the planar plastic member 14, that is, it is made of the same material as the thinner plastic member and it forms a single body without discontinuities in the material forming the planar plastic member 14.

Even when the frame structure is entirely formed as an integral portion of the planar plastic member 14, minor portions of the frame structure may be omitted or removed to allow fluid, electrical or other connections to be made between internal and external regions of electrode unit. Depending on the size of said omitted portions, replacement support for the gasket or compartment liner may be provided.

The overall dimensions of the planar plastic member 14 with inserts 18 may be larger than the monopolar electrochemical cells of the prior art because of the unique electrical distribution means provided by the inserts 18 in the planar plastic member 14 of the present invention. In addition, where the prior art required the use of expensive materials, such as titanium coated copper rods, the present invention may use inexpensive materials. Thus, the overall dimensions of the cell of the present invention are virtually unlimited. However, as a practical matter, dimensions on the range of from about 0.25 square meter to about 4 square meters are preferably used.

The planar plastic member 14 preferably provides the structural integrity required to physically support the adjacent electrolyte compartments while loaded with electrolyte as well as to support the electrode components.

The planar plastic member 14 has a multiplicity of inserts 18 projecting a predetermined distance outwardly from a plastic member into an electrolyte compartment adjacent to the planar plastic member 14. The other side also preferably has inserts 18, but need not necessarily have them. The inserts 18 projecting into an electrolyte compartment are capable of being mechanically and electrically connected to the electrode component, optionally through at least one compatible intermediate situated between the electrode component and each of the inserts 18. Preferably the ends of the inserts 18 lie in the same geometrical plane. The electrode components are preferably welded to the ends of the inserts 18, which are preferably substantially solid. The inserts 18 may, however, contain internal voids, as a result of casting. The inserts 18 are preferably retained within the planar plastic member 14 by means of friction between the plastic and the insert. It is more preferable to increase the friction between these two bodies by having an additional means to restrain the insert within the plastic. Such additional means include, for example grooves (one or more) around the circumference of the insert(s), keys welded to the insert, hole(s) extending into and/or through the insert, slots, rings, collars, studs, or inserts 18.

The inserts 18 can be any material which will permit flow of an electric current. It is convenient to fabricate the insert from a metal, such as aluminum, copper, iron, steel, nickel, titanium, and the like, or alloys or physical combinations including such metals.

To improve the flow of DC electric current into and out of the cell, the inserts 18 are preferably made of a material weldably compatible with the liner it contacts. To form such a planar plastic member 14, rods may be placed in a mold where the inserts 18 are to be positioned, and a castable material may be cast around the rods.

The inserts 18 are preferably spaced apart in a fashion to rigidly support the electrode components. The frequency of inserts 18, whether of round cross section or of elongated or rib-type cross section, per unit area of the flat electrode elements associated therewith may vary within ample limits. The separation between adjacent inserts 18 will generally depend upon the plane resistivity of the particular electrode element used. For thinner and/or highly resistive electrode elements, the spacing of the inserts 18 will be smaller, thus providing a more dense multiplicity of points or electrical contact; while for thicker and/or less resistive electrode elements, the spacing of the inserts 18 may be larger. Normally the spacing between the inserts 18 is within the range of from about 5 to about 30 centimeters (cm) although smaller and larger spacing may be used in accordance with overall design considerations.

The portion of each of the inserts (which are on the side of the unit 14 that connect with the electrode components) and which extend above the planar surface of the planar plastic member 14 is annularly encircled by a shoulder 19. Each of the shoulders 19 is preferably an integral part of the planar plastic member 14 and provides support and stability to each of the inserts 18. The shoulders minimize the propensity of the inserts to move within the planar plastic member 14. Optionally, the shoulders can be present around the inserts on both sides of the planar plastic member 14.

The number, size, and shape of these shoulders may be an important consideration in both the design and operation of the present invention. They may be square, rectangular, conical, cylindrical, or any other convenient shape when viewed in sections taken either parallel or perpendicular to the plastic member. The shoulders may have an elongated shape to form a series of spaced ribs distributed over the surface of the planar plastic member.

A further element which this invention includes is a liner 26 made of a metal sheet fitted over those surfaces of the planar plastic member 14 which would otherwise be exposed to the corrosive environment of the electrolyte compartment environment.

Preferably, the liner 26 is an electrically conductive metal substantially resistant to the corrosion of the electrolyte compartment environment. Preferably the liner 26 is formed so as to fit over the planar plastic member 14 and connect at the inserts 18. More preferably, it connects at the ends of the inserts 18.

Preferably, the liner 26 is sufficiently depressed around the spaced-apart inserts 18 toward the planar plastic member 14 in the spaces between the inserts 18 so as to allow free circulation of the fluids between the lined planar plastic member 14 and the separator or the adjacent electrolyte compartment. Additionally, the liner 26 may have embossed features for fluid directing purposes. These additional embossed features are optionally connected to the inserts in the planar plastic member 14.

It is not necessary that the liner 26 be depressed around the spaced inserts 18 as to contact the planar surface of the planar plastic member 14. Preferably, however, the liner 26 will rest solely over the top surfaces of the inserts 18 and over the surface of the flange portion of the planar plastic member 14.

In situations where the liner 26 is not weldably compatible with the metal of the inserts 18, then in order to be able to weld the liner 26 to the inserts 18, metal coupons 30 may be situated in an abutting fashion between the inserts 18 and the liner 26. The metal layer of the coupons 30 which abut each insert are weldably compatible with the material which the inserts 18 are made and accordingly being welded to said inserts 18. The metal layer of that side of the coupons 30 abutting the liner 26 is weldably compatible with the metallic material of which the liner 26 is made and accordingly is welded to said liner 26 so that the liner 26 is welded to the inserts 18 through the coupons. In most instances wafers made of a single metal or metal alloy serve quite well as intermediates. In some cases these coupons 30 may need to be bi-layer to achieve compatible welds between the insert and the liner 26.

Preferably, a second wafer 31 is placed between wafer 30 and the liner 26. The second wafer is desirable because it minimizes corrosion. When only one vanadium wafer is used between a titanium liner 26 and a ferrous inserts 18, it has been discovered that the corrosive materials contacting the liner 26 during operation of the cell to produce chlorine and caustic seem to permeate into the titanium-vanadium weld and corrode the weld. Rather than use a thicker liner 26, it is more economical to insert a second wafer 31. The second wafer 31 is preferably sufficiently thick to minimize the possibility of the corrosive materials permeating into the plastic member and inserts 18.

In the situation where the liner 26 is a titanium material and the inserts 18 are a ferrous material, then it is preferred to have vanadium wafers serve as the weldably compatible metal intermediates interposed between the inserts 18 and the adjacent liner 26 so that the titanium liner 26 can be welded to the ferrous material inserts 18 through the vanadium wafers. Vanadium and nickel are examples of metals which are weldably compatible with both titanium and ferrous material.

Another way of connecting the liner 26 to the inserts 18, when these metals are weldably incompatible, is through the use of explosion bonding or diffusion bonding. Such methods are known in the art. See, for example, U.S. Pat. No. 4,111,779.

In many instances it is highly desirable that the liner 26 extend over the lateral face of the frame structure to form a sealing face thereat for the separator when the terminal unit 14 is positioned against electrochemical cell units.

In chlor-alkali cells, a liner 26 is most commonly used in anode terminal cells and is less frequently used to line cathode terminal cells. However, those processes where the electrochemical cell is used to produce caustic concentrations greater than about 22 weight percent caustic solution, a catholyte liner 26 may be desirably used. The catholyte liner 26 is made from an electrically conductive material which is substantially resistant to corrosion due to the catholyte compartment environment. Plastic liners may be used in some cases where provision is made for electrically connecting the cathode to the cathode inserts 18 throughout the plastic. Also, combinations of plastic and metal liners may be used. The same is true for anolyte liners.

The liners for the catholyte terminal unit are preferably selected from the group consisting of ferrous materials, nickel, stainless steel, chromium, monel and alloys thereof.

The liners for the anode terminal unit are preferably selected from the group consisting of titanium, vanadium, tantalum, columbium, hafnium, zirconium, and alloys thereof.

In cases where the terminal unit 14 is used in a process to produce chlorine and caustic by the electrolysis of an aqueous brine solution, it is most preferred that the anolyte terminal units be lined with titanium or a titanium alloy.

An electrical connection means 25 is positioned outside of the plastic member 17 and is connected to at least a portion of the inserts 18 using, for example, bolts 35. The connection means 25 is connected to a power supply (not shown) through member 37. Electrical current flows from the connection means 25, through the inserts 18, to electrode component 36. If a liner 26 is used, the current also flows through the liner 26 before it flows to electrode component 36.

An ion exchange membrane 27 may be positioned between the terminal unit 14 and the electrochemical unit 11 as shown in FIG. 3. Representative of the types of ion exchange membranes envisioned for use with this invention are those disclosed in the following U.S. Pat. Nos. 3,909,378; 4,329,435; 4.065,366; 4.116,888; 4,126,588; 4,209,635; 4,212,713; 4,251,333; 4,270,996; 4,123,336; 4,151,053; 4,176,215; 4,178,218; 4,340,680; 4,357,218; 4,025,405; 4,192,725; 4,330,654; 4,337,137; 4,337,211; 4,358,412; and 4,358,545. These patents are hereby incorporated by reference for the purpose of the membranes they disclose.

Electrode components 36 are preferably foraminous structures which are substantially flat and may be made of a sheet of expanded metal perforated plate, punched plate or woven metallic wire. Optionally the electrode components may be current collectors which contact an electrode or they may be electrodes. Electrodes may optionally have a catalytically active coating on their surface. It will be noticed that the flat-surfaced electrodes 36 have their peripheral edges rolled inwardly toward the planar plastic member 14 away from the membrane 27. This is done to prevent the sometimes jagged edges of these electrodes from contacting the membrane 27 and tearing it. Those skilled in the art know other ways of installing electrodes to accomplish the same purpose.

If the electrode 36 is an anode, it may be made from a metal such as one of the common film-forming metals, which is resistant to the corrosive effects of the anolyte during the operation of the cell. Suitable metals are well known to include tantalum, tungsten, columbium, zirconium, molybdenum, and preferably, titanium and alloys containing major amounts of these metals, coated with an activating substance, for example, an oxide of a platinum group metals, such as ruthenium, iridium, rhodium, platinum, palladium, either alone or in combination with an oxide of a film-forming metal. Other suitable activating oxides include cobalt oxide either along or in combination with other metal oxides. Examples of such activating oxides are found in U.S. Pat. Nos. 3,632,498; 4,142,005; 4,061,549; and 4,214,971.

If the electrode 36 is a cathode, it may be constructed of a material which is resistant to the corrosive effects of the catholyte during operation of the cell. Materials suitable for contact with the catholyte will depend upon the concentration of the alkali metal hydroxide in the aqueous solution and may be readily determined by one skilled in the art. Generally, however, materials such as iron, nickel, lead, molybdenum, cobalt, and alloys including major amounts of these metals, such as low carbon stainless steel, are suitable for use as the cathode. The cathodic electrodes may optionally be coated with an activating substance to improve performance of the cell. For example, a nickel substrate could be coated with oxides of nickel and a platinum group metal, such as, ruthenium, or nickel and a platinum group metal, or oxide thereof such as ruthenium oxide, to reduce hydrogen overvoltage. U.S. Pat. No. 4,465,580 describes the use of such cathodes.

Both the anode and the cathode are preferably permeable to the respective electrolyte. The electrodes can be made permeable by several means including, for example, using a punched sheet or plate, an expanded mesh, or woven wire. The anode should be sufficiently porous to permit anolyte and chlorine to pass therethrough and the cathode should be sufficiently porous to permit catholyte to pass therethrough and hydrogen to pass therethrough.

To minimize leakage of electrolyte from the cell after assembling the planar plastic member with a corresponding unit, at least one gasket (not shown) may be positioned between the frames. During assembly of the frames a compressive force is applied to the extremes of the frames to compress the gasket material so that it both seals the ion exchange membrane 27 in position and minimizes leakage of electrolyte from within the final cell series to the exterior of the cells. Preferably, the membrane 27 is positioned to substantially entirely prevent leakage of electrolyte from within the final cell series to the exterior of the cells. Various gaskets materials can be used including, for example, fluorocarbon, chlorinated polyethylene rubber, and ethylene propylene diene terpolymer rubber.

We claim:

1. An article suitable for use as a terminal unit in monopolar or bipolar electrochemical cells comprising:
    an organic, planar plastic member having a plurality of horizontally and vertically spaced-apart shoulders protruding outwardly from opposing generally coplanar surfaces of said planar plastic member;
    at least one electrically conductive insert extending from an exterior face of a shoulder on a first surface of the planar plastic member, through the planar plastic member, to an exterior face of a shoulder on a second surface of the planar plastic member, wherein each of said shoulders annularly encircles and supports each of said inserts;
    an electrically conductive, substantially completely hydraulically impermeable protective liner resistant to the corrosive effects of an electrolyte matingly contacted with the first surface of said planar plastic member and adapted to minimize contact between an electrolyte and said planar plastic member; and
    an electrical connection means electrically connected to at least a portion of the inserts at the second surface of the planar plastic member.

2. The article of claim 1 wherein the liner is a metal selected from the group consisting of titanium, tantalum, zirconium, tungsten, iron, steel, stainless steel, nickel, lead, molybdenum, cobalt, and alloys thereof.

3. The article of claim 1 wherein the insert is a metal selected from the group consisting of aluminum, copper, iron, steel, nickel, titanium, and alloys thereof.

4. The article of claim 1 wherein said liner is attached directly to said insert.

5. The article of claim 1 wherein the liner is titanium, or an alloy thereof;
    at least a portion of said inserts are composed of a ferrous-containing material; and
    said liner is attached, by welding, to at least a portion of said ferrous-containing inserts through an intermediate metal which is weldable compatible with said titanium liner and said ferrous-containing insert.

6. The article of claim 1 wherein the plastic is selected from the group consisting of polyethylene, polypropylene, polyvinylchloride, polystyrene, polysulfone, styrene acrylonitrile, chlorinated polyvinylchloride, acrylonitrile, butadiene and styrene copolymers, epoxy, vinyl esters, polyesters, and fluoroplastics.

7. The article of claim 1 wherein the plastic contains an additive selected from the group consisting of fiberglass, graphite fibers, carbon fibers, talc, glass beads, asbestos, and pulverized mica.

8. The article of claim 7 wherein the plastic contains from about 5 to about 75 weight percent of the additive.

9. The article of claim 1 wherein the plastic contains an additive to reduce thermally induced expansion of said planar plastic member.

10. The article of claim 1 including at least one electrode component electrically contacting at least a portion of the liner.

11. The article of claim 10 wherein the electrode component is hydraulically permeable.

12. The article of claim 10 wherein the electrode component is an uncatalyzed current collector.

13. The article of claim 10 wherein the electrode component is substantially incompressible.

14. The article of claim 10 wherein the electrode component is resiliently compressible.

15. The article of claim 10 wherein the electrode component is directly connected to the inserts.

16. The article of claim 10 wherein the electrode component is indirectly connected to the inserts through a liner.

17. The article of claim 1 wherein the shoulders have a frustoconical shape.

18. The article of claim 1 wherein the shoulders have an elongated rib shape.

19. The article of claim 1 wherein the planar plastic member is surrounded on its peripheral edged with a frame structure having a thickness such that its surface is in a plane above the ends of the plurality of inserts.

20. The article of claim 19 wherein the liner is coextensive with the frame structure.

21. The article of claim 19 wherein the frame structure is a unitized body with the planar plastic member.

22. The article of claim 1 wherein the liner is connected to the inserts by welding through a metal intermediate disposed between the inserts and the liner, the metal of the metal intermediate being not only weldable itself, but also being weldably compatible with both the planar plastic member and liner to the point of being capable of forming a ductile solid solution with them at welds of them upon their welding.

23. The article of claim 1 wherein the electrical connection means is attached to a plurality of the inserts.

24. The article of claim 1 wherein the shoulders are unitary with the planar plastic member.

* * * * *